United States Patent

Kressdorf et al.

[11] Patent Number: 5,459,196
[45] Date of Patent: Oct. 17, 1995

[54] REACTIVE WATER-EMULSIFIABLE BINDERS AND THEIR USE FOR THE PRODUCTION OF LACQUERS

[75] Inventors: Burkhard Kressdorf, Walsrode; Wolfgang Dannhorn, Fallingbostel; Erhard Lühmann, Bomlitz; Lutz Hoppe, Walsrode, all of Germany

[73] Assignee: Wolff Walsrode Aktiengesellschaft, Walsrode, Germany

[21] Appl. No.: 75,208

[22] Filed: Jun. 10, 1993

[30] Foreign Application Priority Data

Jun. 17, 1992 [DE] Germany .................. 42 19 767.8

[51] Int. Cl.⁶ ............................................. C08G 18/67
[52] U.S. Cl. ..................... 524/591; 528/75; 522/97; 525/457; 525/539; 525/440; 526/301
[58] Field of Search ...................... 528/75; 522/97; 524/591; 525/457, 539, 440; 526/301

[56] References Cited

U.S. PATENT DOCUMENTS

| | | | |
|---|---|---|---|
| 4,451,509 | 5/1984 | Frank et al. | 525/444 |
| 4,760,111 | 7/1988 | Ambrose et al. | 524/738 |
| 4,829,123 | 5/1989 | Shigematsu | 525/28 |
| 5,089,586 | 2/1992 | Piepho et al. | 528/75 |
| 5,153,259 | 10/1992 | Padget et al. | 524/591 |

FOREIGN PATENT DOCUMENTS

| | | |
|---|---|---|
| 0084312 | 7/1983 | European Pat. Off. . |
| 0356848 | 3/1990 | European Pat. Off. . |
| 0451590 | 10/1991 | European Pat. Off. . |

*Primary Examiner*—James J. Seidleck
*Assistant Examiner*—R. F. Johnson
*Attorney, Agent, or Firm*—Sprung Horn Kramer & Woods

[57] ABSTRACT

This invention relates to new water-emulsifiable polyester resins, a process for their production and their use as a lacquer row material. These lacquer binders are produced by the reaction of at least one prepolymer A which contains (meth)acryloyl groups and at least one unsaturated water-emulsifiable polyester B with at least one polyisocynate C.

7 Claims, No Drawings

REACTIVE WATER-EMULSIFIABLE BINDERS AND THEIR USE FOR THE PRODUCTION OF LACQUERS

This invention relates to new water-emulsifiable polyester resins, a process for their production and their use as a lacquer raw material.

Aqueous systems based on unsaturated polyesters containing allyl groups are known from DE-OS 3 441 154, DE-OS 2 905 666, DE-OS 2 804 216 and DE-OS 3 218 200. After drying, the polyesters can be cured by high-energy radiation or also peroxidically. However, the curing times are too long for technical application, e.g. for furniture lacquering.

In DE-OS 3 935 495, modified unsaturated polyesters that cure more rapidly are described. The modification is carried out by reaction of these polyesters with isocyanates. Higher-viscosity products are obtained, which have curing rates that are indeed improved but still not sufficient.

Unsaturated polyesters crosslinked with isocyanate, as described in DE-OS 4 011 349, can be emulsified without addition of auxiliary substances and after curing are characterized by good lacquer properties, in particular high hardness, good pore texture on wood, reduced penetration into wood and good adhesion to various substrates. But in these systems also the curing times do not meet the high requirements of the technology (see Comparative Example V 1).

Lacquer binders with reactive olefinic double bonds are those containing acryloyl and/or methacryloyl groups and/or derivatives thereof. A large number of these systems which are described in the patent literature can be emulsified in water, though only in the presence of auxiliary substances. Neutralizing agents, such as alkali or alkaline earth hydroxides, mainly are used (cf. U.S. Pat. No. 4,033,920). Dispersions of this kind have the disadvantage that the neutralizing agents accelerate the saponification of the ester bonds in the binders. In addition, a large part of the neutralizing agent remains in the lacquer, as a result of which its water resistance decreases.

DE-OS 2 853 921 describes polymerizable binder dispersions that consist of water, a polymerizable prepolymer, an external dispersion aid—polyvinylpyrrolidone and/or vinylpyrrolidone/vinyl ester copolymer—and a photoinitiator. The dispersion is produced in presence of organic solvents, which must then be removed via an expensive distillation process. A further disadvantage of dispersions containing protective colloids is that many dispersants coagulate after evaporation of the water and are no longer re-emulsifiable. If, for example, painting machines are clogged with dried up paint residues, the latter can be brought into solution again only with organic solvents. But the use of organic solvents causes an additional expenditure by way of cleaning and waste disposal costs. Finally, the water resistance of the cured lacquers is reduced, since the protective colloids are not incorporated into the lacquer film.

EP 0 084 312 relates to radiation curable aqueous binder emulsions that can be emulsified in water without addition of auxiliary substances. To produce the emulsions, acrylate prepolymers are mixed with emulsifier polyesters and photoinitiators and then emulsified in water. Such emulsions are indeed stable for a fairly long time in storage at room temperature, but at elevated temperatures (40° C.), phase separation occurs after a few days. The separated phases can no longer be converted, e.g. by stirring or shaking, into an emulsion. Dried but not yet cured products of the kind described can indeed be re-emulsified, but quite large agglomerates of particles form. Dried-up binder is therefore not recyclable. Finally, the dilution of the acrylate or methacrylate concentration by the emulsifier polyester causes a clear-cut loss of reactivity during curing by comparison with the lacquer binders according to the invention described later (see Comparative Example V 2). Furthermore, no polyesters containing allyl groups, even those that are stabilized by known methods, can be used as emulsifier polyesters, since these initiate the premature gelation of the binder.

It was the problem of the present invention to make available polymerizable lacquer binders free from reactive diluents that are characterized by rapid curing—as required by the technology—and can be emulsified in water without the concomitant use of external emulsifiers and solvents. After curing, which can be carried out both peroxidically and by radiation chemistry, lacquer films should be obtained that have very good paint properties, such as improved hardness, good non-sag properties, blister-free surface, good pore texture on wood, small penetration into wood and good adhesion to various substrates.

Surprisingly, the problems set could be solved with the lacquer binders described in more detail below. For the preparation of the lacquer binders according to the invention, prepolymers containing (meth)acryloyl groups are mixed with unsaturated water-emulsifiable polyesters and subsequently reacted with polyisocyanates. It is characteristic of the crosslinking step that the reaction of the polyisocyanates with the acrylate prepolymers and the unsaturated polyesters can take place via reactive groups such as e.g. OH, NH and/or COOH, preferably OH. In order to obtain lacquer binders according to the invention, at least 1 mole reactive groups must be available per mole prepolymer and/or prepolymer mixture. After the reaction, the prepolymers containing (meth)acryloyl groups can be linked with the emulsifier polyesters via urethane, biuret, acid amide, allophanate and/or urea structural units, according to the type of functional groups. It is furthermore in accordance with the invention that neither the prepolymer mixture nor the polyisocyanate may be present in dilute form.

The present invention provides lacquer binders obtained by reaction of:

A) 20–80 wt %, preferably 35–65 wt %, of one or more prepolymers containing (meth)acryloyl groups, B) 80–20 wt % preferably 65–35 wt % of one or optionally more unsaturated water-emulsifiable polyesters as emulsifier polyesters with C) 0.1–20 wt %, preferably 0.2–10 wt %, of one or more polyisocyanates.

The invention also provides the use of the reaction products from prepolymers A containing (meth)acryloyl groups, water-emulsifiable polyesters B and polyisocyanates C for the production of emulsions.

The invention also provides the use of the polymers according to the invention as lacquer raw materials.

The reaction products according to the invention from prepolymers A containing (meth)acryloyl groups, unsaturated polyesters B and polyisocyanates C can be emulsified in water without addition of emulsifiers and after drying are characterized by rapid curing with UV light. It has surprisingly been found that the reaction products according to the invention cure considerably faster than the mixtures of acrylate prepolymer A and unsaturated polyesters B alone (see Comparative Example V 2).

It was surprising that polyesters containing allyl ether groups are suitable as emulsifier polyester B. Reaction products that contain such polyesters can be emulsified. The emulsions are stable in storage and do not gel. On the other hand, in the case of mixtures of polyesters containing allyl ether groups and acrylate prepolymers that have not been reacted with polyisocyanates, gelation occurs after only a short time (see Comparative Example V 2).

It was surprising furthermore that dried-up emulsions are recyclable, that is dried but not yet cured lacquer binders can be completely re-emulsified with water to form an emulsion free of agglomerates and e.g. again mixed in with the emulsion production.

The prepolymers A containing (meth)acryloyl groups are products with reactive olefinic double bonds that are derived from methacrylic acid or acrylic acid. Suitable prepolymers with (meth)acryloyl groups are e.g. polyesters, polyethers, polyether polyesters, polyesteramides, polyepoxides, polyols, polyesterurethanes, polyetherurethanes, polyetheresterurethanes, polyvinyl compounds and others. The production of such prepolymers is described in U.S. Pat. Nos. 2,101,107, 2,413,973, 2,951,758, 3,066,112, 3,301,743, 3,368,900, 3,380,831, 3,455,801, 3,469,982, 3,485,732, 3,530,100, 3,551,246, 3,552,986, 3,628,963, 3,660,145, 3,664,861, 3,689,310, 3,719,521, 3,732,107, 3,782,961, 3,840,369, 3,888,830, 4,033,920, 4,206,025, GB 1 006 587, 1 241 823, 1 241 824, 1 321 372 and DE-OS 1 916 499 and 2 853 921.

As particularly suitable prepolymers A containing (meth)acryloyl groups, polyesteracrylates may be mentioned. Particularly preferred polyesteracrylates are condensation products from aliphatic and/or aromatic dicarboxylic acids or, if available, their anhydrides, polyhydric polyols and α,β-unsaturated monocarboxylic acid derivatives.

Possible dicarboxylic acid components are for example: malonic acid, succinic acid, glutaric acid, adipic acid, sebacic acid, hexahydrophthalic acid, terephthalic acid, maleic acid, chloromaleic acid, fumaric acid, citraconic acid, itaconic acid or the anhydrides of the dicarboxylic acids mentioned, provided they can be prepared.

Suitable polyhydric alcohols are ethylene glycol, 1,2-propanediol, 1,3-propanediol, diethylene glycol, dipropylene glycol, 1,3-butanediol, 1,4-butanediol, neopentyl glycol, 1,6-hexanediol, bisalkoxylated bisphenol A, perhydrobisphenol A, cyclohexane-1,4-dimethanol, glycerol, trimethylolpropane, trimethylolethane, pentaerythritylsorbitol, di-trimethylolpropane and di-pentaerythritol.

Methacrylic acid, acrylic acid, methacryloyl chloride, acryloyl chloride, methacrylic acid hydroxyalkyl esters, acrylic acid hydroxyalkyl esters, 2-methylacrylic acid 2-isocyanatoethyl ester, acrylic acid 1,2-dimethyl-3-isocyanatopropyl ester, methacryloyl isocyanate and acryloyl isocyanate are the preferred derivatives of α,β-unsaturated monocarboxylic acids. The polyesteracrylates are produced by the usual methods in one step or stepwise (in UV and EB Curing Formulations for Printing Inks, Coatings and Paints, R. Holman, P. Oldring (ed.), SITA—Technology, 203 Gardner House, Broomhill Road, London SW 18, England, 1988).

All unsaturated polyesters that can be dispersed in water without emulsifiers are possible as emulsifier polyester B. Particularly preferred unsaturated polyesters contain allyl ether groups in addition. Their production is known from DE-OS 3 441 154, 2 905 666, 2 804 216, 4 011 353 and 3 218 200. These polyesters are water-emulsifiable by reason of their polyalkylene glycol content, as is also mentioned in these patent specifications. Particularly preferred emulsifier polyesters are composed of the dicarboxylic acids or their anhydrides previously described in more detail and polyhydric polyols. There can be used for example malonic acid, succinic acid, glutaric acid, adipic acid, sebacic acid, hexahydrophthalic acid, terephthalic acid, maleic acid, chloromaleic acid, fumaric acid, citraconic acid, itaconic acid or the anhydrides of the dicarboxylic acids named, provided they can be prepared.

Suitable polyhydric alcohols are ethylene glycol, 1,2-propanediol, 1,3-propanediol, diethylene glycol, dipropylene glycol, 1,3-butanediol, 1,4-butanediol, neopentyl glycol, 1,6-hexanediol, bisalkoxylated bisphenol A, perhydrobisphenol A, cyclohexane-1,4-dimethanol, glycerol, trimethylolpropane, trimethylolethane, pentaerythritylsorbitol, di-trimethylolpropane and di-pentaerythritol.

In addition the polyesters contain at least one polyhydric polyether alcohol, for example polyethylene glycols or polypropylene glycols and allyl-ether-functional alcohols. Suitable allyl-ether-functional alcohols are allyl, methallyl and ethallyl ethers, such as ethoxylated or propoxylated allyl, methallyl or ethallyl alcohol, glycerol mono- or diallyl ether, trimethylolpropane mono- or diallyl ether, pentaerythritol mono-, di- or triallyl ether and butene-2,3-diol-1,4-monoallyl ether. In addition, monohydric alcohols, such as methanol, ethanol, butanol, pentanol, heptanol, benzyl alcohol, all hexanols, octanols and decanols can be used, individually or in mixtures.

The production is carried out by known methods, e.g. by melt or azeotropic esterification of the alcohols and acids or their anhydrides (cf. Methoden der Organischen Chemie, Houben-Weyl, 4th Edition, Volume 14/2, Georg-Thieme-Verlag, Stuttgart, 1961). Melt polycondensation in an inert gas atmosphere is preferred.

To obtain the lacquer binders according to the invention, the prepolymers A containing (meth)acryloyl groups and the emulsifier polyesters B are intimately mixed together at temperatures below the polycondensation temperature, preferably at 30° to 120° C., in particular between 60° and 80° C., and subsequently reacted with the polyisocyanate component C. For the reaction, neither the mixture nor the polyisocyanate may be present in dilute form. The crosslinking is carried out with aromatic, araliphatic, aliphatic or cycloaliphatic polyisocyanates. Mixtures of these polyisocyanates also can be used. Examples of suitable polyisocyanates are: ethylene diisocyanate, trimethylene diisocyanate, tetramethylene diisocyanate, pentamethylene diisocyanate, hexamethylene diisocyanate, 2-methylpentamethylene diisocyanate, dodecamethylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,3-cyclohexylene diisocyanate, 1,3-phenylene diisocyanate, 1,4-phenylene diisocyanate, 2,4-tolylene diisocyanate, 2,6-tolylene diisocyanate, 1,5-naphthalene diisocyanate, 1,4-naphthalene diisocyanate, 4,4'-diisocyanatodiphenyl ether, 2,3-bis(8-isocyanatooctyl)-4-octyl-5-hexylcyclohexene, isophorone diisocyanate, diphenylmethane-2,4- and/or 4,4'-diisocyanate, cyclobutane-1,3-diisocyanate, 2,6-hexahydrotolylene diisocyanate, 2,4-hexahydrotolylene diisocyanate, hexahydro-1,3- and/or -1,4-phenyl diisocyanate, triphenylmethane-4,4',4"-triisocyanate, trimethylhexane diisocyanate, dicyclohexylmethane-4,4'- and/or -2,4- and/or 2,2'-diisocyanate and their mono- and dimethylsubstituted derivatives as well as triisocyanates and polyisocyanates that are formed by trimerization or oligomerization of diisocyanates or by reaction of diisocyanates with polyfunctional compounds containing OH or NH groups. These include for example the biuret from hexamethylene diisocyanate and water, the isocyanurate of hexamethylene diisocyanate and the adduct of isophorone diisocyanate with trimethylolpropane. Also suitable are blocked, reversibly capped polykis-isocyanates. These include e.g. 1,3,5-tris[6-(1-methylpropylideneaminoxycarbonylamino)hexyl] -2,4,6-trioxohexahydro-1,3,5-triazine and 1,4-bis(2-oxo-1,3,4-dioxazol-5-yl)butane. Hexamethylene diisocyanate is particularly preferred.

For the reaction, known catalysts accelerating the isocyanate addition reaction can also be added. Suitable catalysts are for example tertiary amines, such as triethylamine, triethylenediamine or diethylenebenzylamine or for example known tin catalysts such as tin dioctanoate or dibutyltin dilaurate.

Inhibitors for the prevention of premature polymerization can also be added to the reaction mixture, as described in Methoden der Organischen Chemie, Houben Weyl, 4th Edition, Volume 14/1, p. 433, Georg-Thieme-Verlag, Stuttgart, 1961. These are phenols, phenolic derivatives, preferably sterically hindered phenols such as 2,6-di-tert-butylphenol, amines, nitrosamines, quinones, hydroquinone monoalkyl ethers, phenothiazines or phosphorous acid esters. They are generally used in amounts of 0.001 to 3.0 wt %. Toluhydroquinone, for example, is very suitable.

The reaction products according to the invention are self-emulsifiable. For the production of the oil-in-water emulsions according to the invention, water is stirred in in portions by means of simple stirring devices, dispersers or dissolvers into the lacquer binder.

The lacquer binders are characterized in the cured state by good levelling, scratch resistance, adhesion and hardness. For the achievement of particular technical effects, fillers, pigments, dyes, thixotroping agents, gloss improvers, flatting agents, levelling agents etc. can be added in the usual amounts to the lacquer binders described. The lacquer binders are not only water-emulsifiable but also soluble in organic solvents. The possibility also exists of combining the lacquer binders according to the invention with reactive diluents or other high-molecular lacquer binders, such as e.g. nitrocellulose, polyacrylate resins, alkyd resins, unsaturated polyesters and/or other components curable by radiation.

Suitable forms of application of the emulsions according to the invention are spraying, rolling, doctor coating, curtain coating, brushing and dipping. After evaporation of the water, the binders described can be cured by polymerization. The polymerization can occur thermally and/or by addition of polymerization initiators (e.g. radical formers). High-energy radiation, such as UV-, electron-, X- or gamma-radiation, is also suitable, in which case photoinitiators can be present in addition. UV curing in the presence of photoinitiators is particularly preferred.

The known compounds for radiation curing can be used as photoinitiators, such as e.g. aromatic ketone compounds, benzophenones, alkylbenzophenones, halomethylated benzophenones, Michler's ketone, anthrone and halogenated benzophenones. Also suitable are 2,4,6-trimethylbenzoyl-diphenylphosphine oxide, phenylglyoxylic acid esters, anthraquinone and its numerous derivatives, particularly benzoin and its derivatives, and furthermore benzylketals and hydroxyalkylphenones. Mixtures of these compounds likewise can be used.

The curing can also be carried out, however, with polymerization-initiating radical formers. Water-soluble peroxides, such as hydrogen peroxide and acetylacetone peroxide, are preferred. Methyl ethyl ketone hydroperoxide, cyclohexanone hydroperoxide or the aqueous emulsions of the water-insoluble initiators are also suitable. As is known, these radical formers can be combined with accelerators such as e.g. the heavy metal salts of carboxylic acids, or the chelates of these metals such as the acetates, naphthenates and acetylacetonates of cobalt, manganese or vanadium. The accelerators can also be added, if they are water-soluble, in the form of their aqueous solutions or otherwise as aqueous emulsions.

After curing, coatings characterized by good levelling, scratch resistance, adhesion and hardness are obtained. Possible substrates are wood or wood-like substrates, plastics and metals: wood and wood-like substrates are particularly preferred.

EXAMPLES

Acrylate Prepolymer A

As prepolymers A containing (meth)acryloyl groups, three unsaturated acrylate resins of the BASF AG were used. These are two polyesteracrylates [Laromer LR 8799 (A 1) and Laromer LR 8800 (A 2)] and a polyetheracrylate [Laromer LR 8812 (A 3)].

Emulsifier Polyester B

Used as emulsifier polyesters were the polyester B 1, based on 35.3 wt % trimethylolpropane diallyl ether
27.5 wt % maleic anhydride
12.2 wt % benzyl alcohol
11.8 wt % polyethylene glycol 1500
11.7 wt % 1,2-propanediol
1.5 wt % trimethylolpropane, and the polyester B 2, based on 33.7 wt % trimethylolpropane diallyl ether
26.2 wt % maleic anhydride
11.5 wt % benzyl alcohol
11.2 wt % polyethylene glycol 1500
10.2 wt % 1,2-propanediol
7.2 wt % trimethylolpropane.

The emulsifier polyesters B1 and B2 were prepared by the process (melt polycondensation) known from DE-OS 4 011 349. The acid numbers were 18 to 20 mg KOH/g polymer.

Preparation of the Lacquer Binders According to the Invention

To prepare the lacquer binders according to the invention, first the prepolymers indicated in Tables 1 and 2, consisting of acrylate prepolymer A and emulsifier polyester B, were intimately mixed together. Then the mixture was heated to 70° C. and reacted with various polyisocyanates C and at different polyisocyanate concentrations until isocyanate could no longer be detected by IR spectroscopy (isocyanate bands at $v=2{,}270$ cm$^{-1}$).

Preparation of the Emulsions According to the Invention

The emulsions according to the invention were prepared with a Super-dispax SD 41 of the IKA company. The solids content was 50%.

Testing of the Lacquer Binders

To each of the emulsions there was added and mixed 1.5 wt % of the photoinitiator 2-hydroxy-2-methyl-1-phenyl-propane-1-one. Subsequently the samples were coated onto glass plates with a doctor blade in a film thickness of 90μ, dried and irradiated with UV light (80 W/cm, 3 m/min/lamp). The pendulum hardnesses indicated were determined by König's method (DIN 53 157) 30 min after the UV cure.

The binders were applied similarly to wooden panels, but in a film thickness of 120μ. After drying and curing, the quality of the lacquers according to the invention was assessed. The films are characterized by very good levelling and low penetration into wood. They are transparent, elastic and very scratch resistant. The surfaces are free from craters. Also, no sinking in the pore zone is detectable.

the binders according to the invention cure faster. The checking of the recyclability proved that re-emulsified product according to Comparative Example V 2 contains particles larger than 12μ and is therefore not recyclable. Furthermore a deeper penetration into the wood was observed. The difference of storage stability of the emulsions was very drastic. Although the emulsions according to the invention are stable on storage at 20° C. over months, the emulsion of Comparative Example V 2 has already coagulated after one week, i.e. the product can no longer be applied.

Finally, in Comparative Example V 3, only the polyesteracrylate A 1 is reacted with hexamethylene diisocyanate. The reaction product is not water-emulsifiable and cannot be compared with the binders according to the invention.

TABLE 1

| Composition | Examples | | | | | | | | Comparative Examples | | |
|---|---|---|---|---|---|---|---|---|---|---|---|
| | 1 | 2 | 3 | 4 | 5 | 6 | 7 | 8 | V1 | V2 | V3 |
| Mixture of acrylate prepolymer A (50 wt %) and | A1 | A2 | A3 | A1 | A2 | A3 | A1 | A1 | — | A1 | A1 |
| emulsifier polyester B (50 wt. %) | B1 | B1 | B1 | B2 | B2 | B2 | B1 | B2 | B1 | B1 | — |
| Polyisocyanate (3 wt %) | HDI | HDI | HDI | HDI | HDI | HDI | IPDI | IPDI | HDI | — | HDI |
| Pendulum hardness according to DIN 53 157, 90 μ on glass, measurement 30 min after curing (sec) | 88 | 92 | 86 | 91 | 97 | 84 | 96 | 91 | Film sticks | 60*<br>** | An emulsion could not be prepared |
| Assessment of the surface | Levelling in order, distinct marking of pores, no sagging in pore zone with uniform development of gloss. | | | | | | | | Levelling in order*; round wood pores; sagging in pore zone with gloss reduction | | |
| Behaviour on wood | Crater-free lacquer films, small penetration into wood | | | | | | | | Deeper penetration into wood | | |

*immediately
**after one week the emulsion has coagulated

Checking of the Recyclability

To check the recyclability, an emulsion from Example 1 was applied with a roller unit to various substrates and the excess emulsion left on the roller unit until the water had evaporated. The dried-up binder could be removed with water from the applicator rollers. This binder/water mixture was emulsified with a Dispax SD 41 and the quality of the emulsion evaluated by means of a Mastersizer MS20 of the Malvern Instruments company. The particle diameter was below 5μ: dried-up binder can therefore be recycled.

COMPARATIVE EXAMPLES

For comparative Example V 1, only the emulsifier polyester B 1 was reacted with hexamethylene diisocyanate and emulsified. After curing under identical conditions to those of the examples according to the invention, a non-tack-free film is obtained. According to that, binders of the kind described cure much more slowly than the products according to the invention.

A mixture of acrylate prepolymer A 1 and emulsifier polyester B1 was prepared as Comparative Example V 2. In contrast to the binders according to the invention, the mixture was not reacted with polyisocyanate but immediately emulsified. The testing was carried out under identical conditions to those of the examples according to the invention. By comparison with the pendulum hardness of Examples 1 and 7 according to the invention, the pendulum hardness of Comparative Example 1 is clearly less, that is

TABLE 2

| | Examples | | | | |
|---|---|---|---|---|---|
| Composition | 9 | 1 | 10 | 11 | 12 |
| Mixture of acrylate prepolymer A1 (wt %) and | 40 | 50 | 60 | 50 | 50 |
| emulsifier polyester B1 (wt %) | 60 | 50 | 40 | 50 | 50 |
| Hexamethylenediisocyanate (wt %) | 3 | 3 | 3 | 1 | 7 |
| Pendulum hardness according to DIN 53 157, 90 μ on glass measurement 30 min after curing (sec) | 78 | 88 | 94 | 82 | 101 |
| Assessment of the surface | Very good levelling, crater-free lacquer films | | | | |

We claim:

1. In a self-emulsifiable, polymerizable binder which is produced by the reaction of a mixture comprising at least one prepolymer A which contains (meth)acryloyl groups and at least one allyl ether group containing water-emulsifiable polyester B, the improvement which comprises including in the mixture at least one polyisocyanate C.

2. A binder according to claim 1, wherein the prepolymer A which contains (meth)acryloyl groups contains reactive ethylenic double bonds which are derived from methacrylic acid or acrylic acid.

3. A binder according to claim 1, wherein the allyl group is derived from trimethylolpropane diallyl ether.

4. A binder according to claim 1, wherein the isocyanate is at least one of hexamethylene diisocyanate and isophorone diisocyanate.

5. A binder according to claim 1, which is obtained by the reaction of
- 20–80 wt % of at least one prepolymer A containing (meth)acryloyl groups and
- 80–20 wt % of at least one allyl ether group containing water-emulsifiable polyester B with
- 0.1–20 wt % of one or more polyisocyanates C.

6. A lacquer binder according to claim 1 which contains the reaction product of
- 35–65 wt % of prepolymer A
- 65–35 wt % of B, and
- 0.2–10 wt % of polyisocyanate C.

7. An emulsion comprising water and a self-emulsifiable, polymerizable binder according to claim 1.

* * * * *

UNITED STATES PATENT AND TRADEMARK OFFICE
CERTIFICATE OF CORRECTION

PATENT NO. : 5,459,196
DATED : October 17, 1995
INVENTOR(S) : Kressdorf, et al.

It is certified that error appears in the above-indentified patent and that said Letters Patent is hereby corrected as shown below:

Col. 8, claim 1    Before " prepolymer " insert
line 3             -- polyester --

Signed and Sealed this

Fifth Day of March, 1996

Attest:

BRUCE LEHMAN

Attesting Officer

Commissioner of Patents and Trademarks